June 2, 1925.
F. W. WEST
SECTIONAL GEAR FASTENER
Filed July 6, 1923
1,540,096
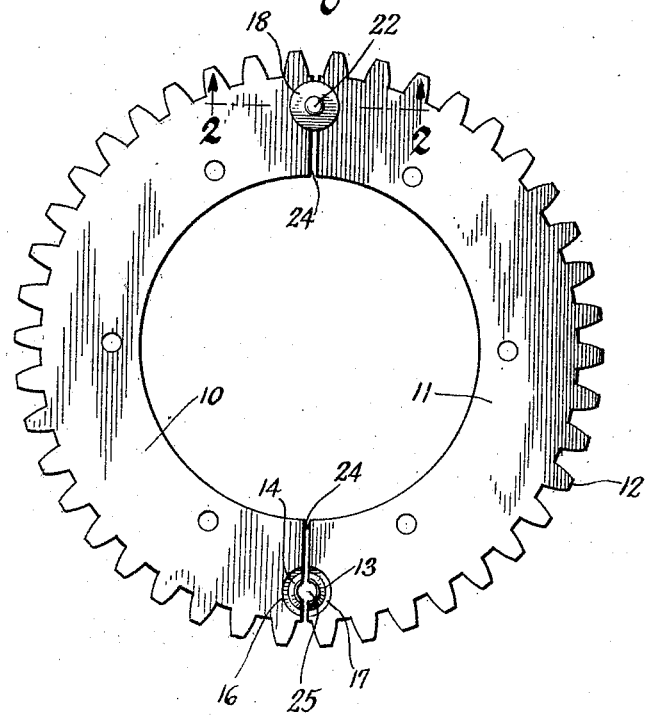
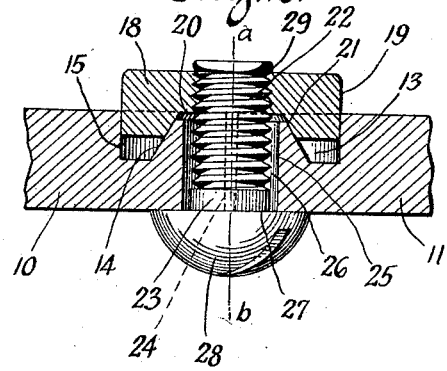
INVENTOR
Frank William West
BY
Warren S. Orton
ATTORNEY Patented June 2, 1925.

1,540,096

UNITED STATES PATENT OFFICE.

FRANK WILLIAM WEST, OF NEW ROCHELLE, NEW YORK, ASSIGNOR, BY MESNE ASSIGNMENTS, TO STEWART-WARNER SPEEDOMETER CORPORATION.

SECTIONAL-GEAR FASTENER.

Application filed July 6, 1923. Serial No. 649,880.

*To all whom it may concern:*

Be it known that I, FRANK WILLIAM WEST, a citizen of the United States, and resident of New Rochelle, in the county of Westchester and State of New York, have invented certain new and useful Improvements in Sectional-Gear Fasteners, of which the following is a specification.

The invention relates in general to an improved fastening means for securing together two parts of a machine structure in definite preset relative position, and the invention specifically relates to an improved means for securing in an interlocked position the sections of a sectional gear in such way that the teeth on one section will be positioned relative to the teeth on the other section so as to form the complete gear with all of its teeth accurately positioned.

In certain situations, such for instance, as in the connecting of a speedometer drive with some turning element of an automotive vehicle, it is required that the speedometer driving gear be mounted in position without necessity of demounting any parts of the vehicle structure to which the gear is to be mounted. This can best be attained by using a sectional or split gear and then securing the sections after they are mounted in position on the turning element. In this art, however, any slight inaccuracy in repositioning the sections to form the complete gear will cause a change in the original pitch of the teeth giving rise to unequal wear on the gear teeth and to the forming of a noisy attachment which is particularly objectionable in high speed speedometer drives.

In such situations it has been proposed to secure the gear sections by means of a bridging plate extending across the jointure between the sections and secured to the sections by through bolts or by locating pins from the plate extending into apertures formed in the sections. It is obvious that extreme care must be exercised in locating the bolts and in locating the pin receiving apertures in the section, otherwise the connection will draw the sections either too closely together or will dispose the sections too far separated to insure the exact locating of the parts necessary to the exact locating of the parts in the structure under discussion.

Accordingly, the primary object of the invention is to provide a simple fastening means for accurately locating mechanical parts such as the sections of a gear but which will not require the exercising of any particular skill or any particular refinement of machining operation to install the device in operative position.

Another object of the invention is to provide a form of bridge plate or connector between sections which will act, when installing the same in position, to draw the sections automatically into their preset relative positions and which will lock the sections in such position and which will effect this nicety of adjustment without necessity of care on the part of the operator to work towards or even to identify such positions.

In connection with a sectional gear or similar preformed machine, parts or articles, a bridging connection is provided designed to have a wedging engagement with the sections after they have been formed and in which suitable wedge receiving slots or grooves are machined in the uncut gear to receive the bridging connection. After the grooves or slots are formed the gear is cut or split between the points, or points of engagement, of the bridging connection and in this way the gear is formed into sections with one of the grooves or a part thereof in each section. Placing the connection in position wedges the sections towards each other.

Another object of the invention is to provide a form of connection which will insure the locating of the sections not only in the plane of the gear but also in directions at right angles to the plane thereby to insure a relative fixing of the sections in all three dimensions.

Still another object of the invention is to provide a form of connection which can be readily machined and in general it is a desideratum to provide an inexpensive and easily practiced method for securing sectional gears, and like parts, in the relative position which they would otherwise have if the sectional parts were in one-piece.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a view in side elevation of a sectional gear secured at one of its junctures by a preferred embodiment of the invention and with the ends adjacent another juncture machined to receive a connector; and Figure 2 is an enlarged transverse sectional view taken through one of the connectors and taken on the line 2—2 of Figure 1.

In the following description and in the claims, parts will be identified by specific names for convenience of expression but they are intended to be as generic in their application to similar parts as the art will permit.

In the drawings and referring particularly to the disclosure in Figure 1, there is shown a sectional gear including a pair of semi-circular sections 10 and 11 but it is to be understood that originally the sections were integrally connected and constituted a one-piece gear provided with properly machined gear teeth 12. In forming such a split gear it is to be understood that prior to splitting the gear into sections, the points where the cut or cuts are to be made are selected, and two such points approximately diametrically disposed were selected in forming the two-part gear illustrated in Figure 1. With the selected points as centers one side of the gear has formed therein a pair of annular grooves 13 which projects into the side of the gear for any desired distance. As the grooves and their coacting nuts are similar in construction the detailed description of one will apply to the other.

The wall 14 forming the inner periphery of the groove is formed frusto-conical and projects inwardly from the adjacent surface and radially and outwardly from the axis of the groove indicated by the central line $a$—$b$ in Figure 2. The wall 15 forming the outer periphery of the groove 13 extends parallel to the axis $a$—$b$ or, differently expressed projects normally to the plane of the gear to form a pair of oppositely disposed curved stops 16 and 17, for engaging the nut as hereinafter described. When the grooves are thus formed the gear is cut in an approximately diametrical direction across both of the grooves and preferably through the axis $a$—$b$ of each groove but this latter refinement in locating the cut is not requisite to the operation of the device.

In order to secure the sections in position there is provided for each groove a cupped nut 18 one side of which is designed as the complement of the groove. More definitely defined the nut is outlined by a circular wall 19 constituting its outer periphery, and designed to have a sliding-snug fit in engagement with the wall 15 outlining the groove. The inner face of the nut provided with a centrally positioned recess 20, the outlining wall 21 of which is frusto-conical and coacts with the wall 14 to form a circular wedge inclined to the axis $a$—$b$ so that the forcing of the nut into the groove will cause the sections to approach the axis $a$—$b$. This approach of the sections is continued until the stops 16 and 17 contact with opposite sides of the outer periphery 19 of the nut.

The nut is forced into the groove by threading into the same shank 22 of a bolt 23 which is passed through the jointure 24 formed between adjacent edges of the section. In those cases where the jointure is relatively narrow and the diameter of the bolt relatively large, it is suggested that a bolt hole 25 be drilled through the gear and centrally along the axis $a$—$b$ prior to the cutting of the gear into sections. It is understood that the bolt is not utilized for the purpose of limiting the approach of the sections and for the purpose of illustrating that the bolt is spaced from the sections, a free space 26 is illustrated in exaggerated showing in Fig. 2.

Where the bolt and nut are further utilized for the purpose of maintaining the sections fixed against lateral movement transversely of the plane of the gear, it is suggested that the side 27 of the head 28 of the bolt which faces the sections be machined flat and perpendicular to the axis of the bolt also indicated by the line $a$—$b$. It is further suggested that the part of the section surrounding the bolt holes and designed to be engaged by the bolt head also be machined part and in a plane parallel to the plane of the gear. Preferably this machining of the part designed to be engaged by the bolt head is finished prior to the cutting of the gear into its sections and in this way it is possible to insure that the parts of the sections designed to be engaged by the bolt be accurately positioned when considered laterally or edgewise of the gear.

In operation and assuming that the gear has been grooved, machined, and split into sections as hereinbefore described, it will be understood that the gear sections are mounted approximately in the desired position following conventional practice. A proper sized nut is positioned in each of the almost located grooves, a proper sized bolt is inserted through the bolt hole threaded through the nut and tightened as far as is possible. The action of the bolt on the nut tends to wedge the sections into their proper present relation, after which the shank ends of the bolts may be upset as indicated at 27 so as to prevent the nuts from accidentally turning off.

By means of a device of the character described it is possible to form a gear or similar unit; to cut the same into sections and re-assemble the sections in their previous relative position in the one-piece gear. There is no need of any accurately locating of pins, studs or bolts or for any care in positioning the apertures for receiving the same. It is simply necessary to groove a side of the gear approximately at the place where a jointure is to come in forming the gear into sections. The bolts and nuts used may be stock parts and the grooves may be readily formed by any suitable circular groove forming machine.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a sectional gear, the combination of two sections adapted to be assembled with an end of one section in juxta-position to an end of the other section and with said ends spaced apart forming a gap therebetween, said gear provided on one side with an annular groove formed partially in one section and partially in the other section, the inner periphery of the groove being frusto-conical, a cupped nut fitted in said groove and adapted to be forced into bearing engagement with said frusto-conical side of the groove and a bolt passed through the gap and in threaded engagement with the nut to secure the same in the groove, the face of the head of the bolt engaging the adjacent side of the sections being flat and the part of the gear engaged by said flat side being machined flat and in a plane perpendicular to the axis of the gear whereby said bolt and nut coact to prevent relative shifting of the gear sections.

2. In a device of the class described, the combination of a member provided on one side with an annular groove having its inner periphery inclined from said side radially away from the axis of the groove and having its outer periphery substantially perpendicular to said side and parallel to said axis, said member being in two parts with the jointure between the parts extending across the groove, a ring connector fitted to said groove and adapted to act in the inclined periphery of the groove to draw the parts towards each other until stopped by the engagement of the outer periphery with the outer side of the ring connector and a bolt for securing the connector in place.

3. In a device of the class described, the combination of a member provided on one side with an annular groove having its inner periphery inclined from said side radially away from the axis of the groove and having its outer periphery substantially perpendicular to said side and parallel to said axis, said member being in two parts with the jointure between the parts extending across the groove, a ring connector fitted to said groove and adapted to act in the inclined periphery of the groove to draw the parts towards each other until stopped by the engagement of the outer periphery with the outer side of the ring connector and a bolt extending through the member and acting on the connector to force the same into operative engagement with the groove.

4. In a device of the class described, the combination of a member provided on one side with an annular groove having its inner periphery inclined from said side radially away from the axis of the groove and having its outer periphery substantially perpendicular to said side and parallel to said axis, said member being in two parts with the jointure between the parts extending across the groove, a ring connector fitted to said groove and adapted to act in the inclined periphery of the groove to draw the parts towards each other until stopped by the engagement of the outer periphery with the outer side of the ring connector.

5. In a device of the class described, the combination of a pair of sections designed to be assembled in a definite cooperative relation, one of the sections provided with a recess outlined on the side adjacent the other section with an inwardly inclined wall and outlined with an oppositely disposed stop wall facing the inclined wall, a connector bridged across the jointure between the sections with one part engaging said other section and with another part designed to extend into said recess in the first named section and acting on the inclined wall to draw the sections together and said connector disposed in the path of movement of the stop wall and adapted to be engaged by the same to limit the approach of the sections towards each other.

6. In a sectional gear, the combination with a pair of gear sections, of a connector for securing the pair of gear sections in a prefixed relative position, said connector provided with means for drawing the sections towards each other and provided with means for limiting the approach of the section.

7. A sectional gear provided on one side with an annuar groove, one of the junctures between adjacent sections extending approximately across a diameter of said groove and a bolt extending through the juncture, in spaced relation to the sections, with a nut on the bolt coacting with the groove to hold the sections in place.

8. A sectional gear including a pair of sections having edges adapted to be disposed in a preset juxtaposition when the sections are assembled to form the gear, a connector bridged across the juncture formed by said edges and connected to the sections to secure the same in position with the teeth of one of the sections in proper relation to the teeth of the other section, said connector and one of the sections provided with means coacting to cause the edges to approach each other and coacting to limit the approach of the edges relative to each other.

9. A sectional gear including a pair of sections having edges adapted to be disposed in a preset juxtaposition when the sections are assembled to form the gear, a connector bridged across the juncture formed by said edges and connected to the sections to secure the same in position with the teeth of one of the sections in proper relation to the teeth of the other section, said connector and one of the sections provided with means coacting to cause the edges to approach each other.

10. In a device of the class described, the combination of a member provided on one side with an annular groove, said member being split across the groove, a ring connector fitted in said groove, the outer periphery of the connector and the inner periphery of the groove being frusto-conical whereby a movement of the ring connector in the direction of its axis will tend to draw the split parts towards each other.

11. A gear comprising separable sections, means for securing the sections in an exact position relative to each other, and thus insure the proper locating of the teeth of the gear, said means including a groove formed partially in one of the sections and partly in the adjacent section and a single connector bridged across the jointure between the sections and fitted in the groove to hold the sections from separating.

12. A gear comprising a pair of sections, each section provided with a groove, a single connector bridged across the jointure between the sections, said connector and said groove provided with inclined inter-engaging surfaces coacting to provide a wedging engagement to draw the sections towards each other and thus insure a proper locating of the gear teeth on one section relative to the gear teeth on the other section.

13. In a sectional gear, the combination with a pair of the gear sections, of a connector for securing the pair of gear sections in proper position, said connector including wedging means acting on the sections to draw the same into their proper relative position.

14. A gear including two sections having edges adapted to be disposed in juxtaposition, a connector bridged across the jointure formed by said edges and acting to secure the sections exactly in prefixed relative position, said connector and one of said sections provided with means coacting to draw one section towards the other and into said prefixed position.

15. In a sectional gear, the combination of a pair of gear sections, a connector bridged across the jointure between the sections, said connector provided with means for drawing the sections into a prefixed exact relative position.

Signed at New Rochelle, in the county of Westchester and State of New York, this 22nd day of June, A. D. 1923.

FRANK WILLIAM WEST.

Witnesses:
F. O. GOODLIFFE,
JOHN P. BROWN.